(12) United States Patent
Huang et al.

(10) Patent No.: US 10,790,611 B1
(45) Date of Patent: Sep. 29, 2020

(54) TELECOMMUNICATION BOX CONNECTOR WITH PROTECTIVE OUTER SHIELD

(71) Applicant: GRAND-TEK TECHNOLOGY CO., LTD., New Taipei (TW)

(72) Inventors: Chyi-Jia Huang, New Taipei (TW); Chun-Chien Chueh, New Taipei (TW); Yi-Chan Wu, New Taipei (TW); Ching-Yi Wu, New Taipei (TW)

(73) Assignee: GRAND-TEK TECHNOLOGY CO., LTD., New Taipei (TW)

( * ) Notice: Subject to any disclaimer, the term of this patent is extended or adjusted under 35 U.S.C. 154(b) by 2 days.

(21) Appl. No.: 16/406,857

(22) Filed: May 8, 2019

(51) Int. Cl.
*H01R 13/52* (2006.01)
*H01R 13/512* (2006.01)

(52) U.S. Cl.
CPC ....... *H01R 13/5202* (2013.01); *H01R 13/512* (2013.01)

(58) Field of Classification Search
CPC ...... H01R 13/512; H01R 9/24; H01R 9/2408; H01R 9/2491
USPC ........................................................ 439/625
See application file for complete search history.

(56) References Cited

U.S. PATENT DOCUMENTS

| | | | | |
|---|---|---|---|---|
| 8,858,261 B2* | 10/2014 | Bauerle | ................ | H01R 9/0518 439/607.41 |
| 9,722,364 B1* | 8/2017 | Chueh | .................... | H01R 24/64 |
| 9,866,006 B2* | 1/2018 | Albert | .................. | H01R 9/0518 |
| 2009/0035993 A1* | 2/2009 | Okayasu | ................ | H01R 4/185 439/607.41 |
| 2011/0085764 A1* | 4/2011 | Greub | .................. | G02B 6/3879 385/60 |
| 2012/0196463 A1* | 8/2012 | Marvin | ................. | E21B 47/011 439/271 |

* cited by examiner

*Primary Examiner* — Peter G Leigh
(74) *Attorney, Agent, or Firm* — Chun-Ming Shih; HDLS IPR SERVICES (57) ABSTRACT

A telecommunication box connector with a protective outer shield includes a connector main body and a protective outer shield covering onto the connector main body. The connector main body includes a first external connecting portion. The protective outer shield includes a shield member, a second connecting portion protruding out of the shield member and an inner connecting portion formed inside the shield member. The protective outer shield is connected to the first outer connecting portion via the inner connecting portion in order to cover and protect the connector main body. The protective outer shield is installed onto an installation portion of a telecommunication box via the second outer connecting portion. Consequently, it is able to cover and protect the connector main body from damages due to cold weather while maintaining the overall weight with a slight increase only.

11 Claims, 8 Drawing Sheets

TELECOMMUNICATION BOX CONNECTOR WITH PROTECTIVE OUTER SHIELD

BACKGROUND OF THE INVENTION

Field of the Invention

The technical field relates to a telecommunication box connector, in particular, to a telecommunication box with a protective outer shield.

Description of Related Art

Conventionally, a telecommunication box connector is typically used for connecting a cable to a telecommunication box for communication purposes. In other words, a telecommunication box connector is configured at the external of a telecommunication box.

Since most of telecommunication boxes are installed outdoor, telecommunication box connectors made of plastic materials are subject to breakages and damages due to exposure in cold weather and collisions. Nevertheless, if the entire unit of telecommunication box connector is changed to use a metal material, it can result in excessive overall weight, and this is particularly prominent for the case where a multiple number of telecommunication box connectors are connected to a single telecommunication box, leading a much greater overall weight of the box and causing problems in the securement thereof.

In view of above, the inventor seeks to overcome the aforementioned drawbacks associated with the currently existing technology after years of research and development along with the utilization of academic theories, which is also the objective of the development of the present invention.

SUMMARY OF THE INVENTION

An objective of the present invention is to provide a telecommunication box connector with a protective outer shield.

To achieve the aforementioned objective, the present invention provides a telecommunication box connector with a protective outer shield, used for installing at an installation portion of a telecommunication box, comprising: a connector main body having a first external connecting portion; and a protective outer shield having an inner connecting portion and comprising a shield member and a second connecting portion connected to each other; the second connecting portion detachably installed onto the installation portion; the protective outer shield detachably connected to the first outer connecting portion via the inner connecting portion in order to cover and protect the connector main body.

In comparison to the prior art, the present invention is able to achieve the following technical effects: It is able to cover and protect the connector main body from damages due to cold weather. In addition, it is able to achieve minor weight increase of the box such that it is able to facilitate the securement thereof at the same time.

DETAILED DESCRIPTION OF THE INVENTION

The following provides a detailed technical content of the present invention along with the accompanied drawings. However, the accompanied drawings are provided for reference and illustrative purpose only such that they shall not be used to limit the scope of the present invention.

Figure 5:
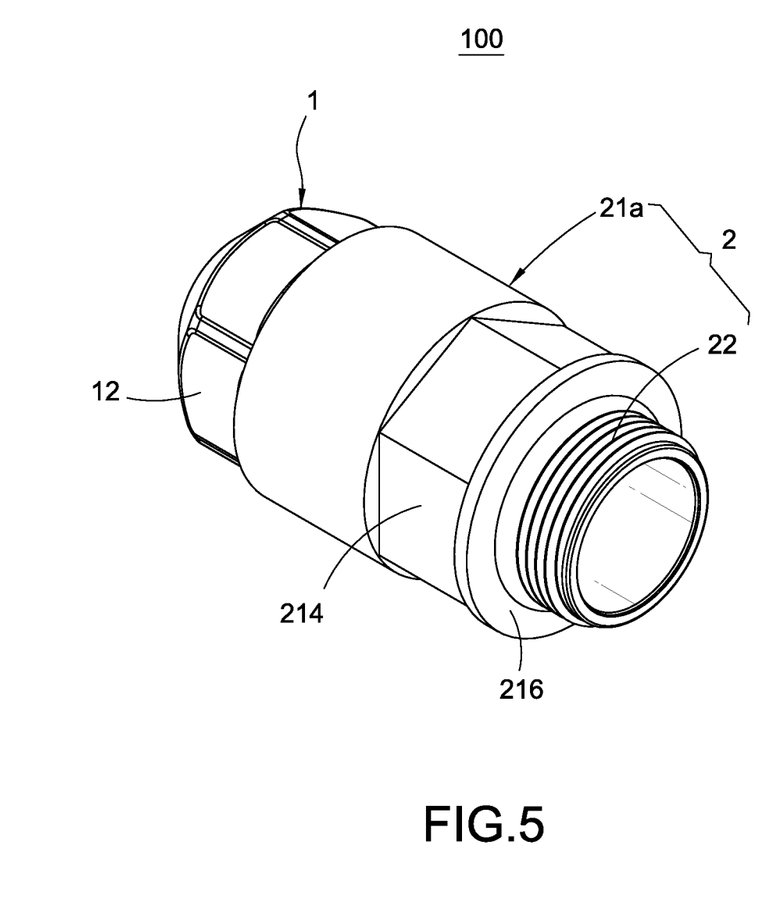
FIG. 5 is a perspective view of a telecommunication box connector according to an exemplary second embodiment of the present invention.
Figure 6:
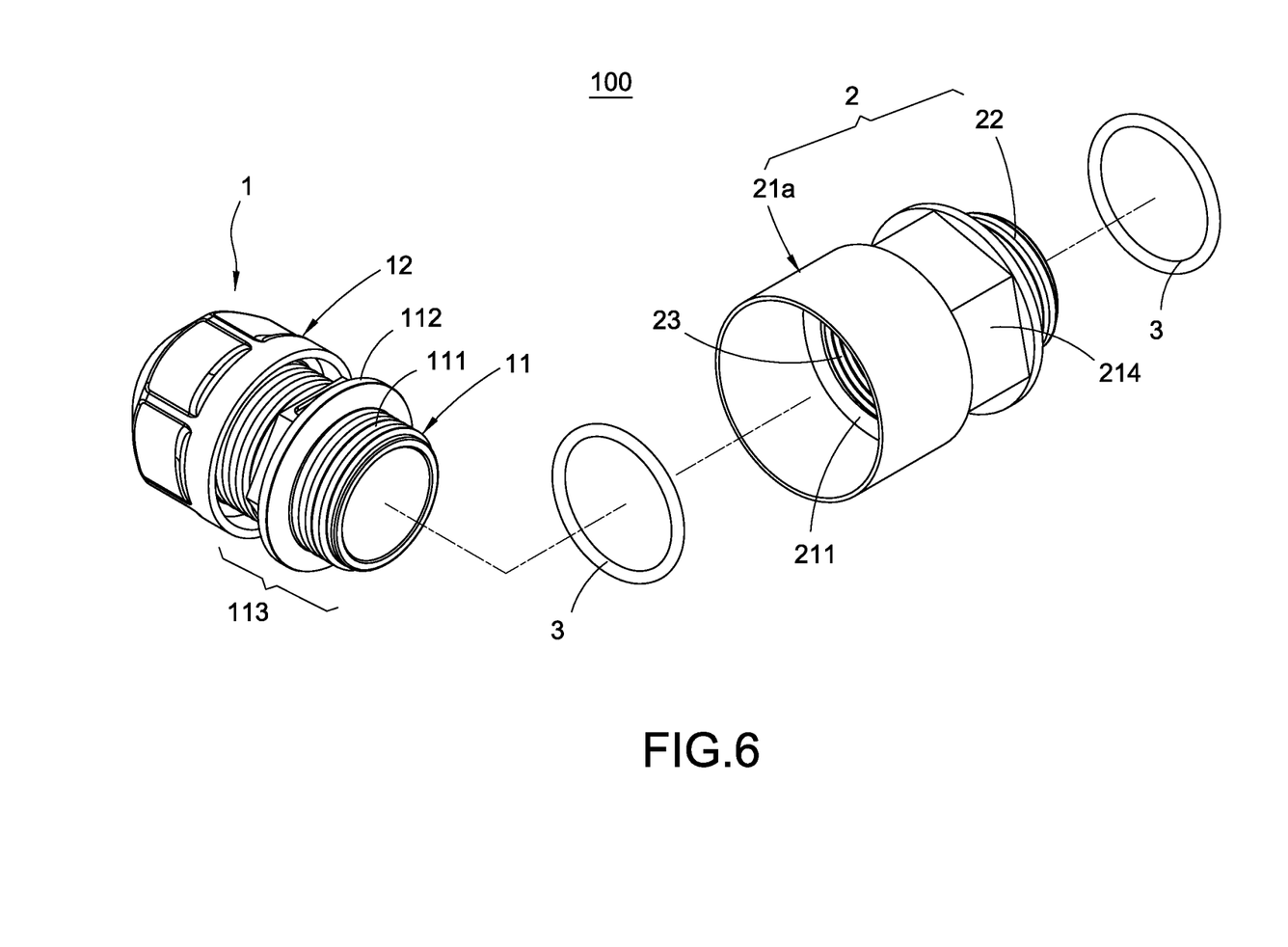
FIG. 6 is a perspective exploded view according to FIG. 5.
Figure 7:
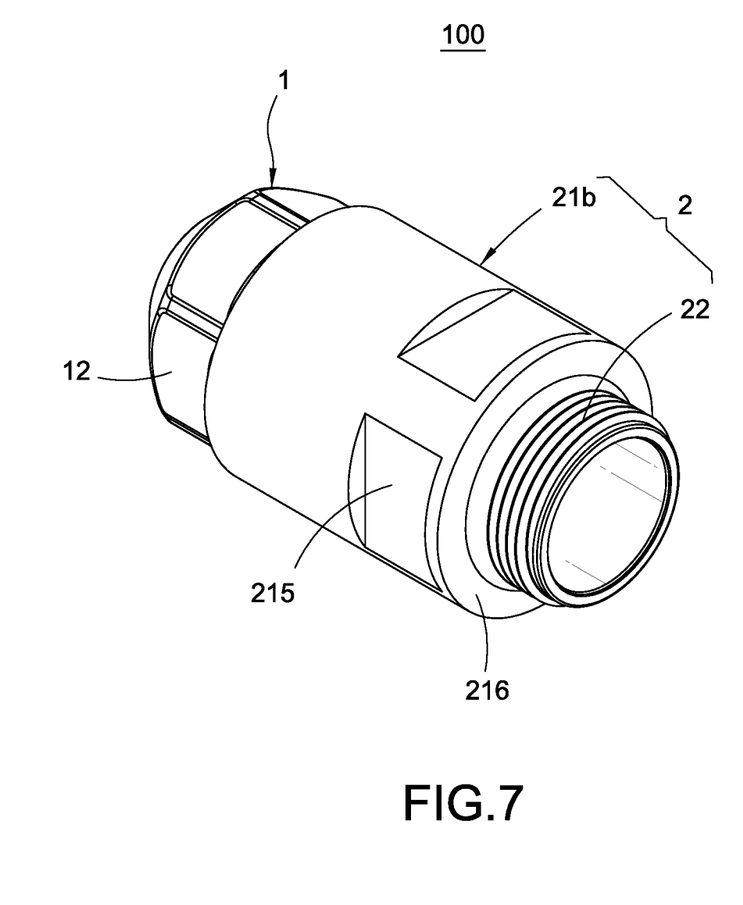
FIG. 7 is a perspective view of a telecommunication box connector according to an exemplary third embodiment of the present invention.
Figure 8:
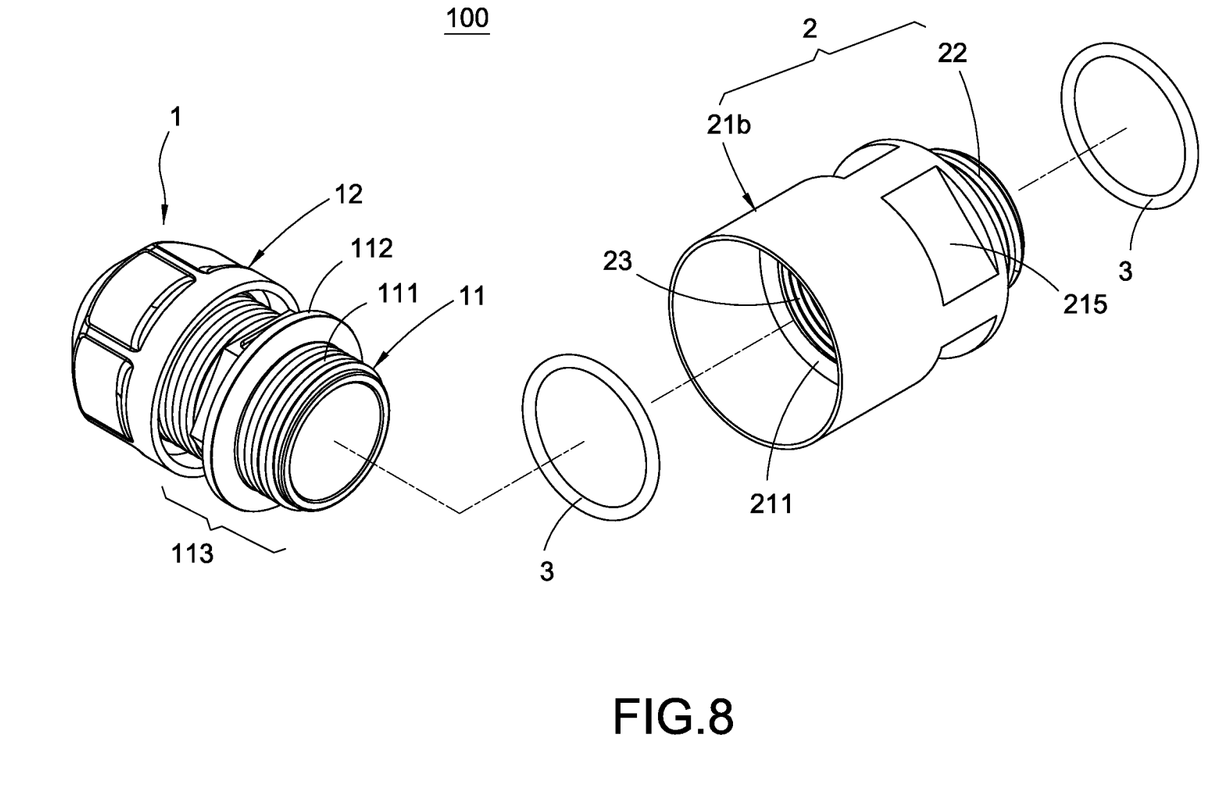
FIG. 8 is a perspective exploded view according to FIG. 7.

The present invention provides a telecommunication box connector with a protective outer shield, used for installing at an installation portion of a telecommunication box 700. FIG. 1 to FIG. 4 show an exemplary first embodiment of the present invention, FIG. 5 to FIG. 6 show an exemplary second embodiment of the present invention, and FIG. 7 to FIG. 8 show an exemplary third embodiment of the present invention.

According to the exemplary first embodiment shown in FIG. 1 to FIG. 4, a telecommunication box connector 100 comprises a connector main body 1 and a protective outer shield 2.

The connector main body 1 includes a first outer connecting portion 111. The connector main body 1 can be entirely made of a plastic material or can also be partially made of a plastic material.

The protective outer shield 2 mainly includes an inner connecting portion 23 and comprises a shield member 21 and a second outer connecting portion 22 connected to each other. The second outer connecting portion 22 can be detachably installed onto the installation portion 7 of the telecommunication box 700. The protective outer shield 2 can be made of any material capable of withstanding cold weather, and in this exemplary embodiment, a metal outer shield made of a metal material is used for illustration.

The inner connecting portion 23 is detachably connected to the first outer connecting portion 111 in order to allow the protective outer shield 2 to cover and protect the entire connector main body 1 (not shown in the drawings) in such a way that the entire connector main body 1 or the plastic material portion of the connector main body 1 is protected from damages and breakages due to cold weather and collision. Furthermore, the telecommunication box connector 100 of the present invention can further allow the second outer connecting portion 22 of the protective outer shield 2 to be detachably installed onto the installation portion 7 of the telecommunication box 700 correspondingly. As a result, a cable not shown in the drawings (penetrating into the hollow portion of the telecommunication box connector 100 of the present invention) can be connected to the telecommunication box 700.

It shall be noted that the connector main body 1 can also comprise an insulative main body 11 and a rear shield 12 as shown in the drawings. The rear shield 12 can be made of a metal material and configured to cover one end of the insulative main body (see FIG. 3) in order to allow the insulative main body 11 includes an exposed portion 113 (see FIG. 2) protruded out of the rear shield 12. In addition, the present invention is not limited to the aforementioned configuration location of the inner connecting portion 23. In this exemplary embodiment, it is arranged between two opposite ends of the protective outer shield 2 (see FIG. 3) as an example for illustration. Preferably, the inner connecting portion 23 is arranged at an inner wall of the shield member 21 and is at a location adjacent to the second connecting portion 22. Furthermore, the first outer connecting portion 111 is located at the exposed portion 113 (particularly, at another end of the insulative main body 11, see FIG. 3) in order to allow the protective outer shield 2 to at least cover the exposed portion 113 of the insulative main body 11 as shown in the drawings.

Figure 3:
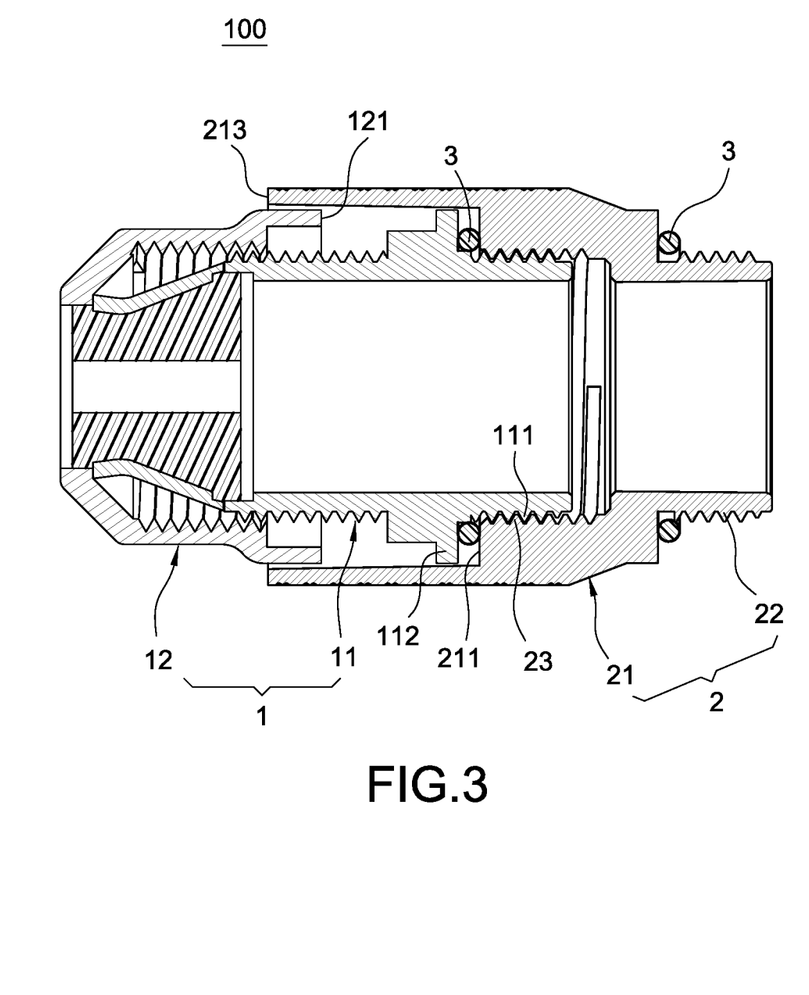
FIG. 3 is a cross sectional view according to FIG. 1.
Figure 4:
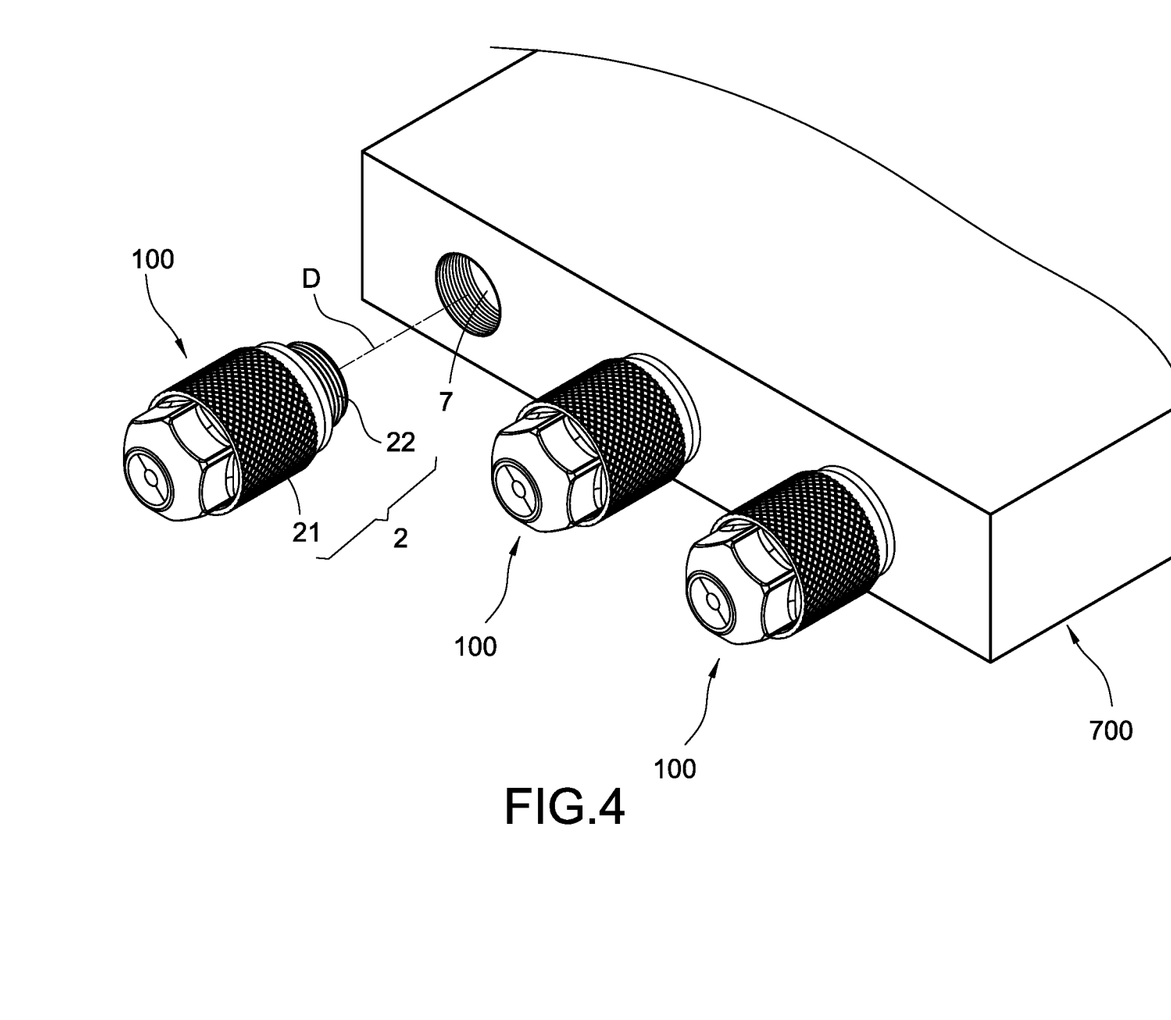
FIG. 4 is a perspective exploded view of a telecommunication box connector according to an exemplary first embodiment and a telecommunication box.

Preferably, as shown in FIG. 4 in conjunction with FIG. 3, the protective outer shield 2 is configured to install onto the installation portion 7 via the second outer connecting portion 22 along an installation direction D. The rear shield 12 includes a first shielding edge 121 facing toward the installation direction D, and the protective outer shield 2 includes a second shielding edge 213 facing opposite from the from the installation direction D. In addition, the first shielding edge 121 and the second shielding edge 213 overlap with each other in order to allow the insulative main body 11 to be covered and protected by the protective outer shield 2 and the rear shield 12 at the same time. Furthermore, the protective outer shield 2 and the rear shield 12 partially overlap with each other in order to prevent any gaps in the protection.

In addition, the insulative main body 1 includes an outer wall having the outer protruding edge 112 protruded thereon, and the protective outer shield 2 includes an inner wall having the inner protruding edge 211 formed thereon and opposite from the outer protruding edge 112. Accordingly, when the protective outer shield 2 is connected onto the connector main body 1, the outer protruding edge 112 and the inner protruding edge 211 are able to abut against each other for stopping, thereby limiting the protective outer shield 2 to connect to a predefined location on the connector main body 1. To be more specific, the inner protruding edge 211 is formed via a wall thickness difference of the inner wall of the shield member 21.

Furthermore, the present invention is not limited to the installation method between the first outer connecting portion 111 and the inner connecting portion 23 as well as between the second outer connecting portion 22 and the installation portion 7, such that as long as they can be detachably installed onto each other, e.g.: insertion, latch or screw fastening etc. In this exemplary embodiment, the screw fastening method as shown in the drawings is used as an example for illustration.

In the exemplary first embodiment as shown in FIG. 1 to FIG. 4, the outer wall of the shield member 21 includes an anti-slip surface 212 in order to facilitate a user to directly use fingers to grip onto the anti-slip surface 212 of the shield member 21 to drive the protective outer shield 2 to rotate such that it can be fastened onto the first outer connecting portion 111 or fastened onto the installation portion 7.

In an exemplary second embodiment of the present invention as shown in FIG. 5 and FIG. 6 and in an exemplary third embodiment of the present invention as shown in FIG. 7 and FIG. 8, they are generally identical with the aforementioned first exemplary embodiment. The differences among these exemplary embodiments rely in the shield members 21a, 21b of the exemplary second and third embodiments. The shield members 21a, 21b are devoid of the aforementioned anti-slip surface 212; instead, the outer walls of the shield members 21a, 21b in the exemplary second and third embodiments are formed of a polygonal shaped portion 214, 215 respectively in order to facilitate a user to use a hand tool to hold the polygonal shaped portions 214, 215 to drive the outer protective shield 2 to rotate.

Figure 1:
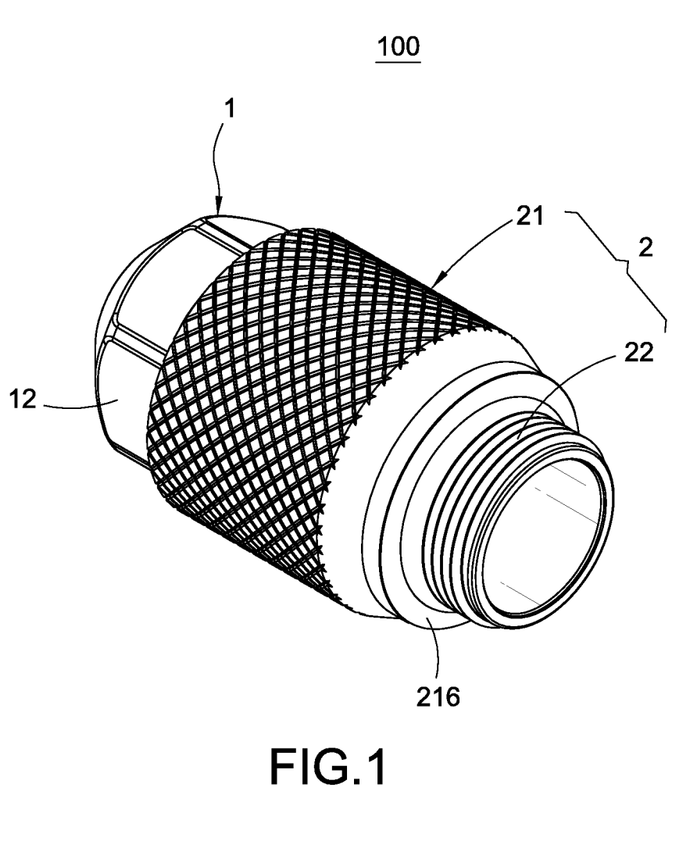
FIG. 1 is a perspective view of a telecommunication box connector according to an exemplary first embodiment of the present invention.
Figure 2:
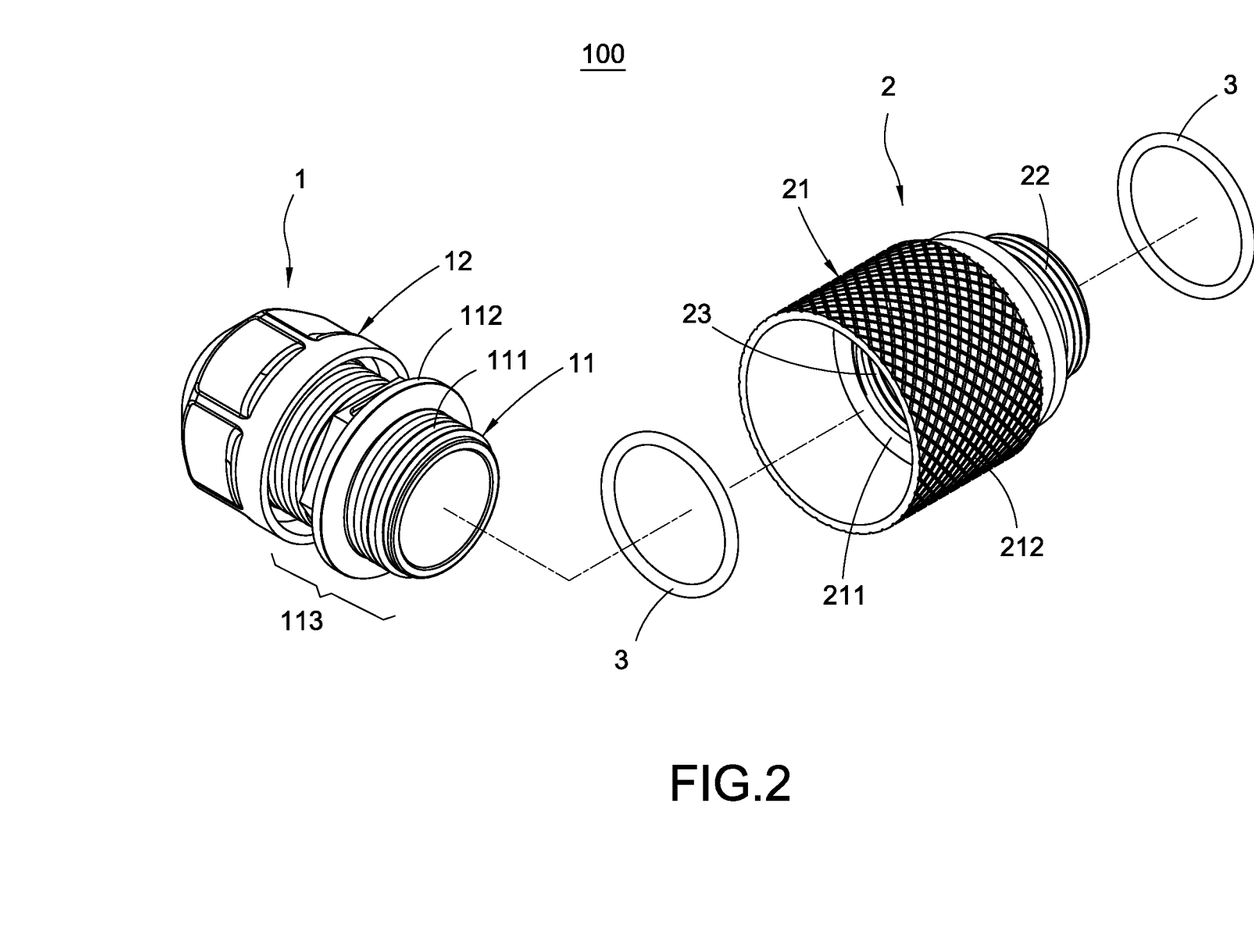
FIG. 2 is a perspective exploded view according to FIG. 1.

Moreover, in the exemplary first, second and third embodiments of the present invention, as shown in FIG. 1, FIG. 5 and FIG. 7, a stopping portion 216 is formed between the outer wall of the protective outer shield 2 and the second outer connecting portion 22 such that when the telecommunication box connector 100 is connected to the telecommunication box 700, it is able to use the stopping portion 216 to stop at the outer wall of the telecommunication box 700. In addition, a gasket 3 can be further installed between the outer protruding edge 112 and the inner protruding edge 211 as well as between the stopping portion 216 and the outer wall of the telecommunication box 700 in the exemplary first, second and third embodiments of the present invention.

In view of the above, the present invention is able to achieve the following technical effects in comparison to the prior arts. As the connector main body 1 is covered with the protective outer shield 2, the protective outer shield 2 is able to cover the connector main body 1 in order to protect the plastic material portion of the connector main body 1 from damages due to cold weather. Alternatively, the two ends of the insulative main body 11 are connected with the protective outer shield 2 and rear shield 12 respectively in order to jointly cover the entire insulative main body 11, thereby protecting the insulative main body 11 made of plastic material from damages due to cold weather (and/or allow the protective outer shield 2 to cover the insulative main body 11 and the rear shield 12 at the same time, not shown in the drawings). Furthermore, with the use of the protective outer shield 2 in a hollow shield shape to cover the connector main body 1, it is able to only slightly increase the overall weight of the telecommunication box connector 100 of the present invention. As a result, when a single telecommunication box 700 is connected with a multiple number of telecommunication box connectors 100, the overall weight can be maintained with a slight increase only; consequently, the problem of securement difficulty can be overcome.

Moreover, the present invention is able to further achieve the other technical effects. As the protective outer shield 2 and the rear shield 12 overlap with each other, it is able to prevent any gaps in the protection. With the shield members, 21, 21a, 21b, respectively formed of an anti-slip surface 212, a polygonal shaped portion 214 and another polygonal shaped portion 215, they are able to allow fingers to grip onto the member for rotation or to use hand tool to hold such member for rotation.

The above describes the preferable and feasible exemplary embodiments of the present invention for illustrative purposes only, which shall not be treated as limitations of the scope of the present invention. Any equivalent changes and modifications made in accordance with the scope of the claims of the present invention shall be considered to be within the scope of the claim of the present invention.

What is claimed is:

1. A telecommunication box connector with a protective outer shield, used for installing at an installation portion of a telecommunication box, comprising:
   a connector main body having a first outer connecting portion; and
   a protective outer shield having an inner connecting portion and comprising a shield member and a second connecting portion connected to each other; the second outer connecting portion detachably installed onto the installation portion; the protective outer shield detachably connected to the first outer connecting portion via the inner connecting portion in order to cover and protect the connector main body, wherein the connector main body and the protective outer shield are formed in cylindrical shape, the first outer connecting portion is a first outer threaded portion protruded from one end of the connector main body, the second outer connecting portion and the inner connecting portion are disposed at a same end of the protective outer shield, the second outer connecting portion is a second outer threaded end protruded outwardly from one end of the protective outer shield, the inner connecting portion is an inner threaded portion disposed inside the protective outer shield, the first outer threaded portion screws into the inner threaded portion.

2. The telecommunication box connector with a protective outer shield according to claim 1, wherein the connector main body comprises an insulative main body and a rear shield arranged at one end of the insulative main body; the insulative main body includes an exposed portion protruding out of the rear shield; the protective outer shield covers at least the exposed portion.

3. The telecommunication box connector with a protective outer shield according to claim 2, wherein the protective outer shield is configured to install onto the installation portion via the second outer connecting portion along an installation direction; the rear shield includes a first shielding edge facing toward the installation direction, and the protective outer shield includes a second shielding edge facing opposite from the installation direction; the first shielding edge and the second shielding edge overlap with each other.

4. The telecommunication box connector with a protective outer shield according to claim 2, wherein the first outer connecting portion is located at the exposed portion.

5. The telecommunication box connector with a protective outer shield according to claim 1, wherein the connector main body further includes an outer protruding edge, and the protective outer shield includes an inner protruding edge; the outer protruding edge and the inner protruding edge abut against each other for stopping.

6. The telecommunication box connector with a protective outer shield according to claim 5, wherein the connector main body comprises an insulative main body and a rear shield arranged at one end of the insulative main body; the insulative main body includes an outer wall having the outer protruding edge formed thereon, and the shield member includes an inner wall having the inner protruding edge formed thereon.

7. The telecommunication box connector with a protective outer shield according to claim 6, wherein the inner wall of the shield member forms the inner protruding edge via a wall thickness difference.

8. The telecommunication box connector with a protective outer shield according to claim 1, wherein the protective outer shield is a metal outer shield.

9. The telecommunication box connector with a protective outer shield according to claim 1, wherein the outer wall of the shield member includes an anti-slip surface formed thereon.

10. The telecommunication box connector with a protective outer shield according to claim 1, wherein the outer wall of the shield member includes a polygonal shaped portion formed thereon.

11. The telecommunication box connector with a protective outer shield according to claim 1, wherein an engagement area between the outer wall of the shield member and the second outer connecting portion is formed of a stopping portion, and the stopping portion is stopped at the telecommunication box.

* * * * *